(12) United States Patent
Oi

(10) Patent No.: US 8,427,955 B2
(45) Date of Patent: Apr. 23, 2013

(54) METHOD AND APPARATUS FOR TRANSFERRING DATA

(75) Inventor: Kenji Oi, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1159 days.

(21) Appl. No.: 11/036,392

(22) Filed: Jan. 18, 2005

(65) Prior Publication Data

US 2006/0083230 A1    Apr. 20, 2006

(30) Foreign Application Priority Data

Oct. 15, 2004    (JP) ................................. 2004-301797

(51) Int. Cl.
   *H04L 12/54*    (2006.01)
(52) U.S. Cl.
   USPC .............................. 370/236; 370/366; 710/71
(58) Field of Classification Search .................. 370/359,
      370/362–366, 395.64, 395.7, 395.74, 400,
      370/401, 412, 422, 462–463, 465–466, 503–505,
      370/528, 535, 537–538, 540, 230, 231, 235,
      370/236; 710/65, 71; 365/189–225; 711/100
   See application file for complete search history.

(56) References Cited

U.S. PATENT DOCUMENTS

| | | | | |
|---|---|---|---|---|
| 4,744,079 A * | 5/1988 | Csapo et al. | ................... | 370/463 |
| 4,748,560 A * | 5/1988 | Kataoka | ........................... | 710/107 |
| 5,140,417 A * | 8/1992 | Tanaka et al. | ............. | 375/240.01 |
| 5,301,192 A * | 4/1994 | Henrion | ........................... | 711/100 |
| 5,325,361 A * | 6/1994 | Lederer et al. | ................. | 370/401 |
| 5,463,630 A * | 10/1995 | Tooher | ........................... | 370/535 |
| 5,499,263 A * | 3/1996 | Schmit et al. | ................... | 370/537 |
| 5,539,846 A * | 7/1996 | Morikura et al. | ............... | 385/24 |
| 5,828,663 A * | 10/1998 | Ikegami | ......................... | 370/347 |
| 6,006,286 A * | 12/1999 | Baker et al. | ..................... | 710/22 |
| 6,052,376 A * | 4/2000 | Wills | ............................. | 370/419 |
| 6,118,786 A * | 9/2000 | Tiernan et al. | ................. | 370/416 |
| 6,181,712 B1* | 1/2001 | Rosengren | ..................... | 370/474 |
| 6,243,395 B1* | 6/2001 | Fujimori et al. | ............. | 370/466 |
| 6,243,778 B1* | 6/2001 | Fung et al. | ..................... | 710/113 |
| 6,292,491 B1* | 9/2001 | Sharper | ......................... | 370/412 |
| 6,298,406 B1* | 10/2001 | Smyers | ......................... | 710/305 |
| 6,333,938 B1* | 12/2001 | Baker | ........................... | 370/503 |
| 6,442,630 B1* | 8/2002 | Takayama et al. | ............ | 710/105 |
| 6,560,275 B2* | 5/2003 | Lecourtier et al. | ............ | 375/220 |
| 6,754,742 B1* | 6/2004 | Alowersson et al. | ........... | 710/53 |
| 6,804,251 B1* | 10/2004 | Limb et al. | ..................... | 370/444 |
| 7,016,346 B1* | 3/2006 | Alowersson et al. | ......... | 370/363 |
| 7,065,291 B2* | 6/2006 | Sano et al. | ..................... | 386/111 |
| 7,099,324 B2* | 8/2006 | Kametani | ..................... | 370/392 |

(Continued)

FOREIGN PATENT DOCUMENTS

| | | |
|---|---|---|
| JP | 10-303949 | 11/1998 |
| JP | 2000-286855 | 10/2000 |

*Primary Examiner* — Michael Thier
*Assistant Examiner* — Curtis A Alia
(74) *Attorney, Agent, or Firm* — Staas & Halsey LLP

(57) ABSTRACT

A method for transferring plural pieces of packet data from a plurality of terminal devices to a host device with an IEEE 1394 serial bus. The method includes transferring the plural pieces of packet data from the terminal devices to a transfer controller, storing the plural pieces of packet data in a buffer memory of the transfer controller, and sequentially transferring the packet data stored in the buffer memory to the host device. This method substantially increases data transfer speed without increasing the transfer speed at nodes and cables when transferring data with the IEEE 1394 serial bus.

18 Claims, 8 Drawing Sheets

U.S. PATENT DOCUMENTS

| | | | |
|---|---|---|---|
| 7,835,285 B2 * | 11/2010 | Ayyagari et al. | 370/236 |
| 2002/0018458 A1 * | 2/2002 | Aiello et al. | 370/348 |
| 2002/0054626 A1 * | 5/2002 | Inamura | 375/219 |
| 2002/0167955 A1 * | 11/2002 | Shimojo | 370/411 |
| 2002/0172229 A1 * | 11/2002 | Parvin et al. | 370/521 |
| 2003/0076821 A1 * | 4/2003 | Takauchi et al. | 370/366 |
| 2003/0110303 A1 * | 6/2003 | Chen et al. | 709/250 |
| 2003/0120739 A1 * | 6/2003 | Garney et al. | 709/213 |
| 2005/0021827 A1 * | 1/2005 | Matsuura | 709/232 |
| 2005/0190784 A1 * | 9/2005 | Stine | 370/445 |

\* cited by examiner

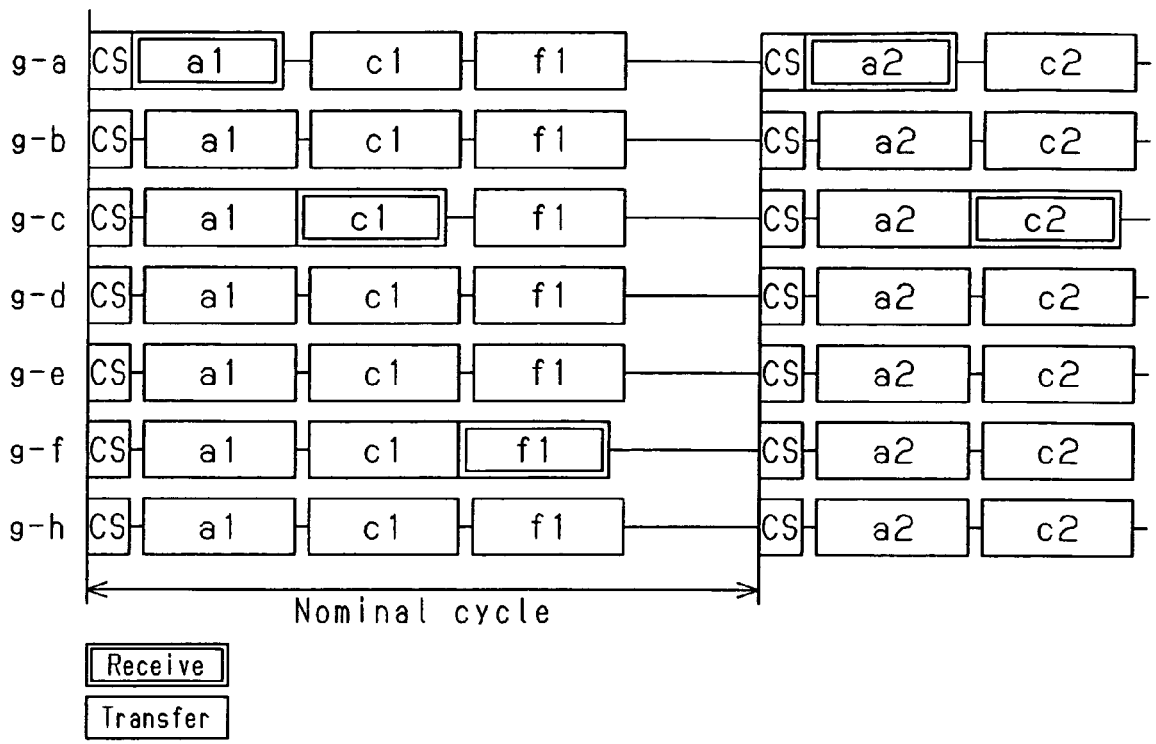
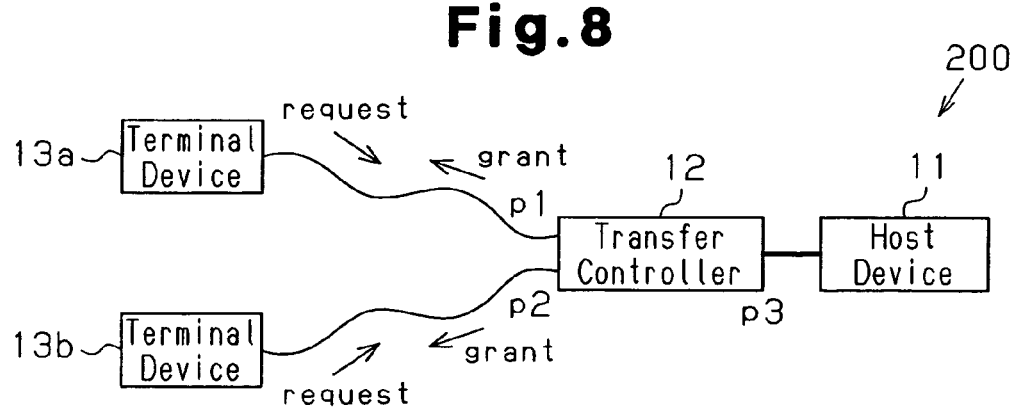
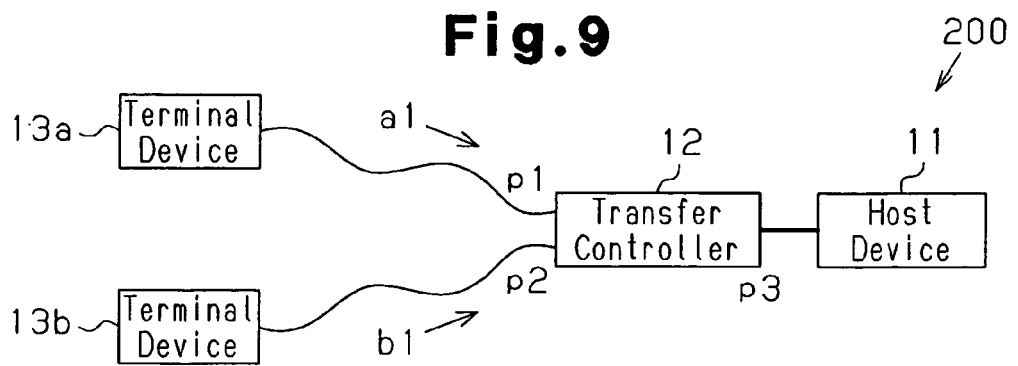

METHOD AND APPARATUS FOR TRANSFERRING DATA

CROSS-REFERENCE TO RELATED APPLICATIONS

This application is based upon and claims the benefit of priority from the prior Japanese Patent Application No. 2004-301797, filed on Oct. 15, 2004, the entire contents of which are incorporated herein by reference.

BACKGROUND OF THE INVENTION

The present invention relates to a method for transferring data, and more particularly, to a method for transferring data with an Institute of Electric and Electronics Engineers (IEEE) 1394 serial bus.

In recent years, data transfer apparatuses with IEEE 1394 serial buses have been used in multimedia environments and other various environments. In such a data transfer apparatus, to increase the data transfer speed, every node where data transfer is performed and cables between the nodes must be applicable to high speed operation. However, a higher transfer speed at the nodes or cables increases power consumption and raises costs. Thus, when nodes at which the data transfer speed is relatively low are also included, a narrowed band caused by the nodes must be prevented and the data transfer speed must be increased.

FIG. 1 shows a data transfer apparatus 100 with an IEEE 1394 serial bus. The data transfer apparatus 100 has a basic topology. A host device 1 has ports p1 and p2 respectively connected to, for example, two terminal devices 2a and 2b by IEEE 1394 cables. Data is transferred between the host device 1 and the terminal devices 2a and 2b or between the terminal devices 2a and 2b via the host device 1.

A typical bus arbitration operation performed by the data transfer apparatus 100 will now be described. A cycle start packet (hereafter referred to as CS) is transmitted from the ports p1 and p2 of the host device 1 to the terminal devices 2a and 2b. Then, the terminal devices 2a and 2b transmit a request signal to the host device 1. In response to the request signal, when the port p1 transmits a grant signal to, for example, the terminal device 2a, the terminal device 2a transmits packet data a1 to the host device 1, as shown in FIG. 2. The host device 1 then transfers the transmitted packet data a1 from the port p2 to the terminal device 2b.

FIG. 3 shows the input and output timing at the ports p1 and p2 during data transfer. The data transfer is performed by repeating a nominal cycle, in which one cycle has 125 microseconds. Each nominal cycle includes an isochronous period and an asynchronous period. Data transfer is performed during the isochronous period. The host device 1 transmits the CS from the ports p1 and p2 when each nominal cycle is started.

During the isochronous period, following the output of the CS, the host device 1 receives packet data a1 from the terminal device 2a through the port p1 and transmits the packet data a1 from the port p2 to the terminal device 2b. Further, the host device 1 receives packet data b1 from the terminal device 2b through the port p2 and transfers the packet data b1 from the port p1 to the terminal device 2a. Such data transfer is repeatedly performed during the isochronous period. Further, data transfer is performed in an asynchronous manner during the asynchronous period.

The above data transfer is performed in an optimal manner when the nodes and the cables operate at a relatively high speed and sufficient transfer speed and band are ensured.

FIG. 4 shows the operation when a node having a relatively low transfer speed is included in the topology. In such a case, the transfer speed of the packet data a1 and b1 is restricted by the speed of the relatively slow node. This narrows the transfer band. As a result, the ratio between the isochronous period and the asynchronous period changes. This may cause the asynchronous period to be insufficient.

FIG. 5 shows an example in which additional nodes are further connected to the host device in the topology of FIG. 1. Node g corresponds to the host device, and nodes a to f correspond to the terminal devices. The node g transfers packet data sequentially received from the nodes a to f to the node h or other nodes.

FIG. 6 shows the receiving and transferring of data at the node g. In this case, all of the nodes operate at a relatively high speed, and sufficient transfer speed and band is ensured. More specifically, the node g outputs the CS to other nodes when the nominal cycle is started and sequentially receives packet data a1 to f1 from the nodes a to f. Then, the node g transfers the received packet data a1 to f1 to every node. Through such operation, packet data from each of the nodes a to f is received and transferred during a single nominal cycle.

FIG. 7 shows the operation that is performed when nodes having a relatively low transfer speed are included in the topology of FIG. 5. In such a case, the transfer speed of the packet data is always restricted by the speed of the slow nodes. As a result, the transfer of the packet data a1 to f1 cannot be completed during a single nominal cycle. Thus, isochronous transfer fails.

Japanese Laid-Open Patent Publications 10-303949 and 2000-286855 describes a data transfer apparatus using the above IEEE 1394 serial bus.

SUMMARY OF THE INVENTION

In the above data transfer apparatus, packet data is sequentially transmitted from each node after providing each node with the grant signal. Accordingly, if nodes having a relatively low transfer speed are mixed in the topology thus lowering the transfer speed of each node, it becomes difficult to ensure a sufficient asynchronous period. This results in a problem in that isochronous transfer fails.

Further, there is a problem in that higher costs and power consumption cannot be avoided when increasing the transfer speed at every node and cable.

The present invention provides a method for transferring data with a data transfer apparatus using an IEEE 1394 serial bus that increases the transfer speed without having to increase the transfer speed at nodes and cables.

One aspect of the present invention is a method for transferring packet data from a plurality of terminal devices to a host device with a serial bus. The method includes transferring plural pieces of packet data in parallel from the terminal devices to a transfer controller including a temporary storage device, storing the plural pieces of packet data in the temporary storage device, and sequentially transferring the plural pieces of packet data stored in the temporary storage device to the host device.

Another aspect of the present invention is a method for performing isochronous transfer of packet data from a plurality of terminal devices to a host device with a serial bus. The method includes transferring plural pieces of packet data in parallel from the terminal devices to a transfer controller including a temporary storage device during a first cycle, storing the plural pieces of packet data in the temporary storage device, and sequentially transferring the plural pieces of packet data stored in the temporary storage device to the host device during a second cycle.

A further aspect of the present invention is an apparatus for transferring plural pieces of packet data with a serial bus. The apparatus includes a plurality of terminal devices that respectively generate the plural pieces of packet data. A transfer controller is connected to the terminal devices and includes a temporary storage device. The transfer controller receives the plural pieces of packet data in parallel from the terminal devices and stores the received plural pieces of packet data in the temporary storage device. A host device is connected to the transfer controller. The transfer controller sequentially transfers the plural pieces of packet data stored in the temporary storage device to the host device.

Another aspect of the present invention is an apparatus, connected between a plurality of terminal devices and a host device, for controlling transfer of plural pieces of packet data from the terminal devices to the host device. The apparatus includes a temporary storage device. A transceiver unit, connected to the temporary storage device, receives the plural pieces of packet data in parallel from the terminal devices, stores the received plural pieces of packet data in the temporary storage device, and sequentially transfers the plural pieces of packet data stored in the temporary storage device to the host device.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 7 is an explanatory diagram showing data transfer in the topology of FIG. 5 that includes nodes having a relatively low transfer speed;

FIG. 8 is a schematic block diagram showing a data transfer apparatus having a basic topology according to a preferred embodiment of the present invention;

FIG. 9 is a schematic block diagram showing the operation of the data transfer apparatus of FIG. 8;

DETAILED DESCRIPTION OF THE PREFERRED EMBODIMENTS

FIG. 8 shows a data transfer apparatus 200 according to a preferred embodiment of the present invention. The data transfer apparatus uses an IEEE 1394 serial bus and has a basic topology. The data transfer apparatus 200 includes a host device 11, a transfer controller 12, and terminal devices 13a and 13b. The host device 11 is connected to the transfer controller 12 by an IEEE 1394 serial bus cable. The transfer controller 12 has ports p1 and p2 that are connected to the terminal devices 13a and 13b by IEEE 1394 serial bus cables.

The terminal devices 13a and 13b, which are connected to the ports p1 and p2 of the transfer controller 12 by the cables, are nodes having a relatively low transfer speed and enable only low speed data transfer. A further port p3 of the transfer controller 12 and the host device 11 are connected to each other in a manner enabling low speed data transfer and high speed data transfer.

The terminal devices 13a and 13b do not transfer data (i.e., receive and transfer data) therebetween during the isochronous period and only transmits data with the host device 11. For example, cameras that output dynamic image data as packet data may be employed as the terminal devices 13a and 13b.

Referring to FIG. 8, the transfer controller 12 provides each of the terminal devices 13a and 13b with a CS. When receiving a request signal from each of the terminal devices 13a and 13b, the transfer controller 12 provides the terminal devices 13a and 13b with a grant signal in parallel. Referring to FIG. 9, the transfer controller 12 receives in parallel packet data a1 and b1 respectively transmitted from the terminal devices 13a and 13b, temporarily holds the packet data, and then transmits the packet data a1 and b1 to the host device 11.

Figure 10:
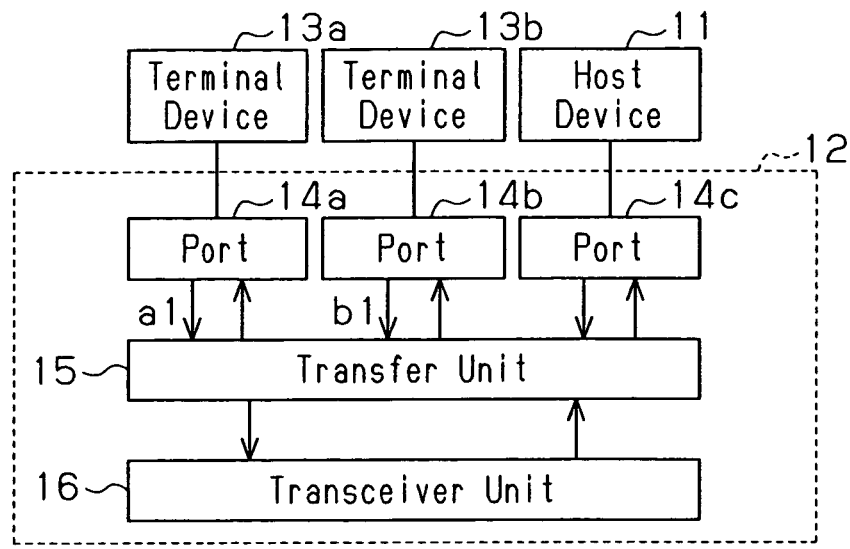
FIG. 10 is a schematic block diagram showing a data controller of the data transfer apparatus of FIG. 8.

FIG. 10 is a schematic block diagram of the transfer controller 12. The transfer controller 12 includes three ports 14a, 14b, and 14c, a transfer unit 15, and a transceiver unit 16. The ports 14a to 14c respectively correspond to the ports p1 to p3 and are connected to the transfer unit 15. The transfer unit 15 is connected to the transceiver unit 16. The transceiver unit 16 does not perform normal isochronous transfer in accordance with the IEEE 1394 standard during the isochronous period and performs normal asynchronous transfer during the asynchronous period.

Figure 11:
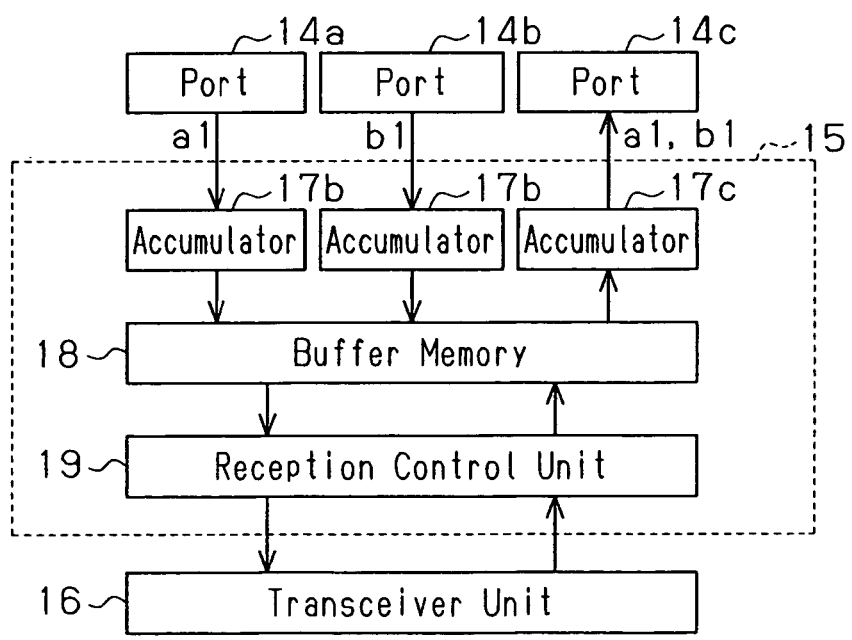
FIG. 11 is a schematic block diagram showing a transfer unit of the data transfer controller of FIG. 10.

FIG. 11 is a schematic block diagram of the transfer unit 15. The transfer unit 15 includes three accumulators 17a, 17b, and 17c, a buffer memory 18, and a reception control unit 19. The accumulators 17a and 17b, which are used to receive data, temporarily store the packet data a1 and b1 provided from the ports 14a and 14b, respectively. Further, the accumulators 17a and 17b respectively store the packet data a1 and b1 in the buffer memory 18 in a time sharing manner. The accumulator 17c receives the packet data a1 and b1 stored in the buffer memory 18 and sequentially provides the packet data a1 and b1 to the port 14c.

Figure 12:
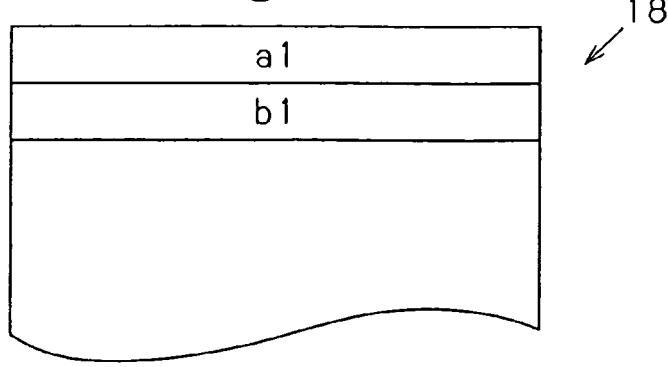
FIG. 12 is an explanatory diagram showing data stored in a buffer memory of the transfer unit of FIG. 11.

Referring to FIG. 12, the buffer memory 18 stores the packet data a1 and b1 in a predetermined storage section in single packet units. The reception control unit 19 functions as an interface between the buffer memory 18 and the transceiver unit 16. The transceiver unit 16 controls via the reception control unit 19 the storage of the packet data a1 and b1 to the buffer memory 18 and the reading of the packet data a1 and b1 from the buffer memory 18.

Figure 13:
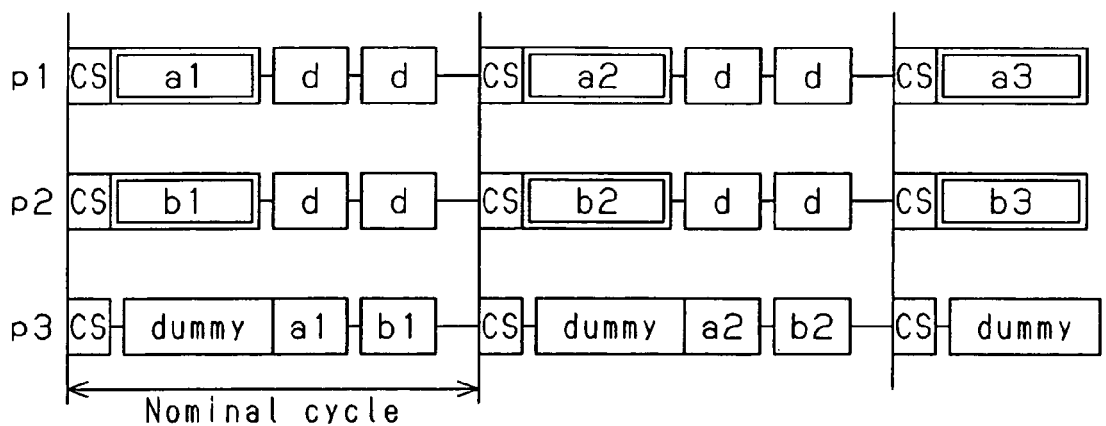
FIG. 13 is an explanatory diagram showing the operation of the transfer controller of FIG. 10.

The operation of the transfer controller 12 in the data transfer apparatus 200 will now be described with reference to FIG. 13.

After the terminal devices 13a and 13b are provided with the CS and the request signal and grant signal are exchanged, the transfer controller 12 receives the different packet data a1 and b1 from the terminal devices 13a and 13b and stores the packet data a1 and b1 in the buffer memory 18. During this process, the transfer controller 12 transmits a dummy packet in lieu of a normal data packet from the port p3 to the host device 11 to ensure the occupancy right of the bus.

The transfer controller 12 then sequentially reads and transfers the packet data a1 and b1 stored in the buffer memory 18 from the port p3 to the host device 11. In the example of FIG. 13, the transfer speed of data from the port p3 to the host device 11 is two times the transfer speed of data between the terminal devices 13a and 13b and the ports p1 and p2. The transfer controller 12 transfers dummy packets to the terminal devices 13a and 13b when the packet data a1 and b1 is transferred to the host device 11. After one nominal cycle is completed, the same operation is repeated in the next nominal cycle.

Figure 1:
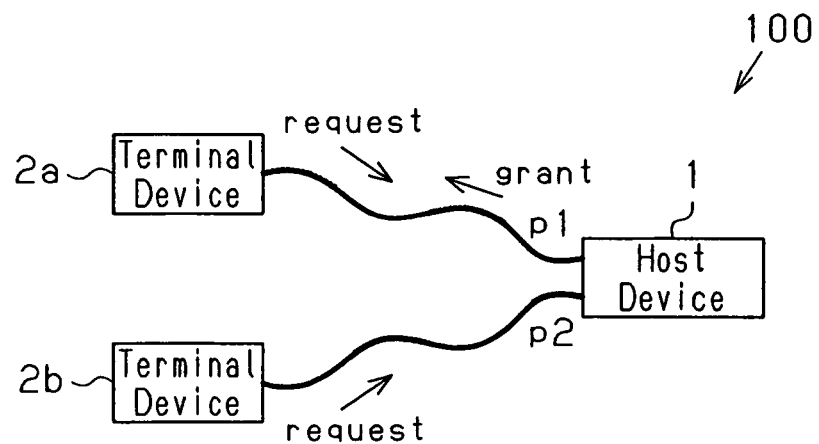
FIG. 1 is a schematic block diagram showing a data transfer apparatus having a basic topology in the prior art.
Figure 2:
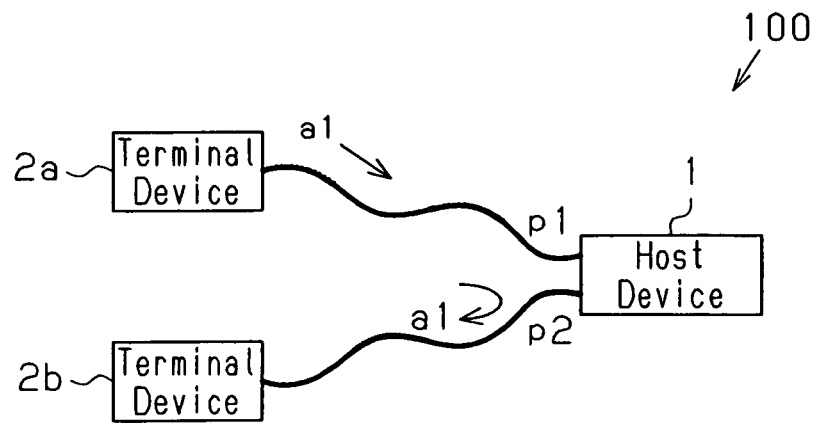
FIG. 2 is a schematic block diagram showing the operation of the data transfer apparatus of FIG. 1.
Figure 3:
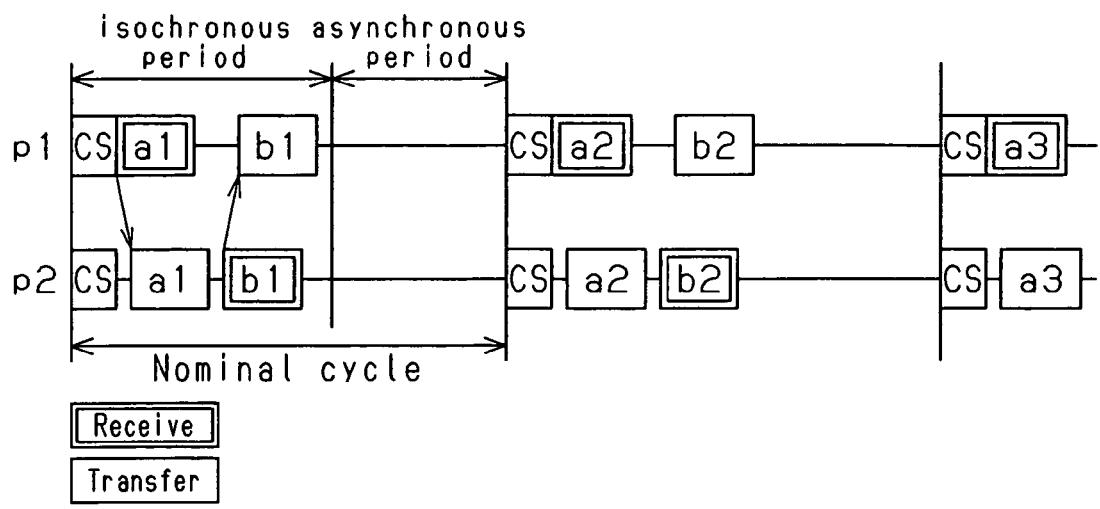
FIG. 3 is an explanatory diagram showing data transfer in the data transfer apparatus of FIG. 1.
Figure 4:
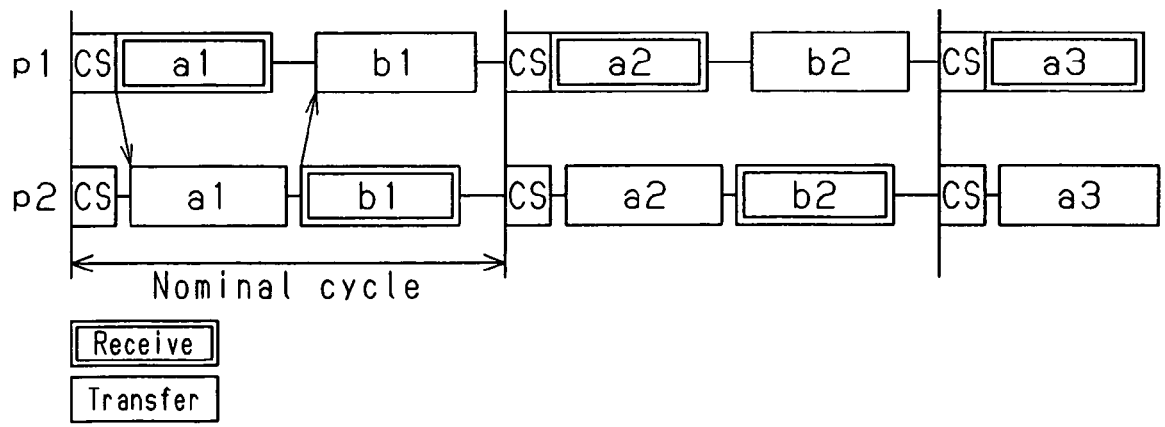
FIG. 4 is an explanatory diagram showing data transfer in the data transfer apparatus of FIG. 1 that includes nodes having a relatively low transfer speed.
Figure 5:
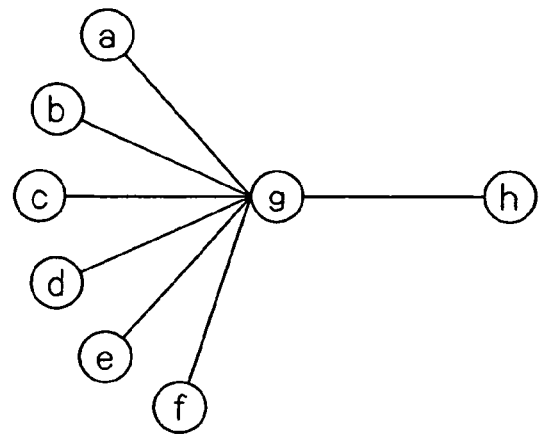
FIG. 5 is an explanatory diagram showing a topology including additional terminal devices in the prior art.
Figure 6:
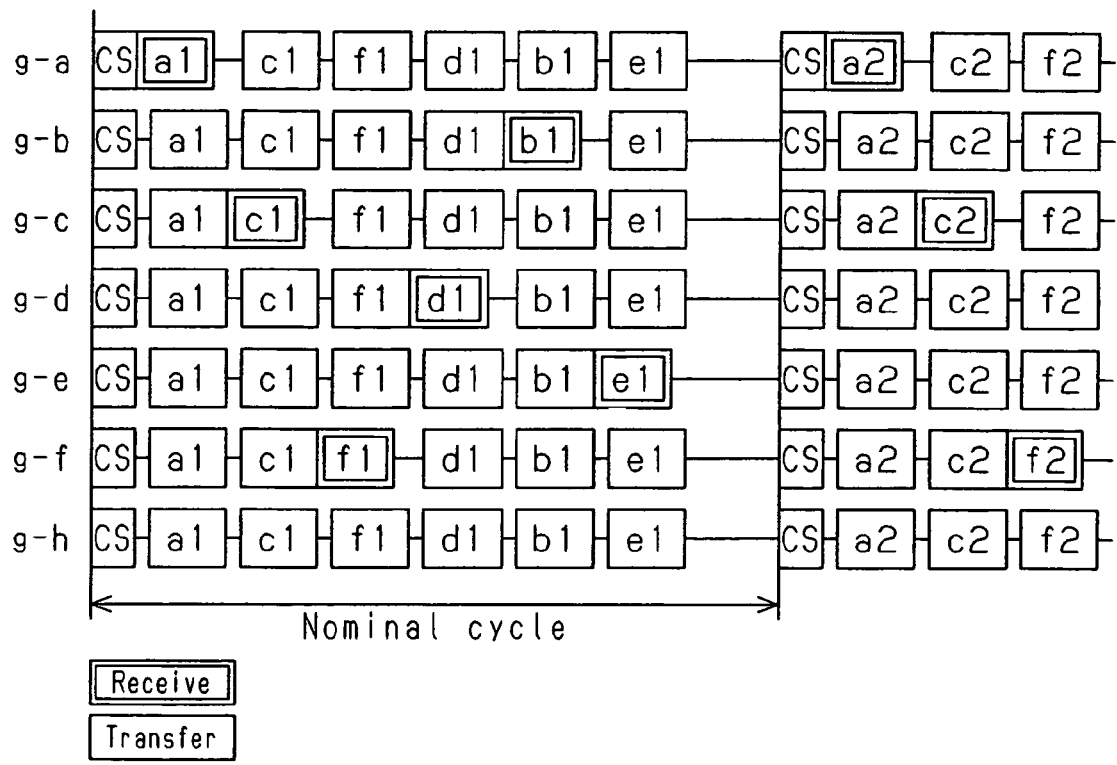
FIG. 6 is an explanatory diagram showing data transfer in the topology of FIG. 5.

When the two terminal devices 13a and 13b exist during such operation, the time required to receive and complete transfer of the packet data a1 and b1 is the same in the prior art example of FIG. 4 and the present embodiment. However, as the quantity of the terminal devices 13a and 13b increases, the difference in the transfer time between the prior art example and the preferred embodiment increases.

Figure 14:
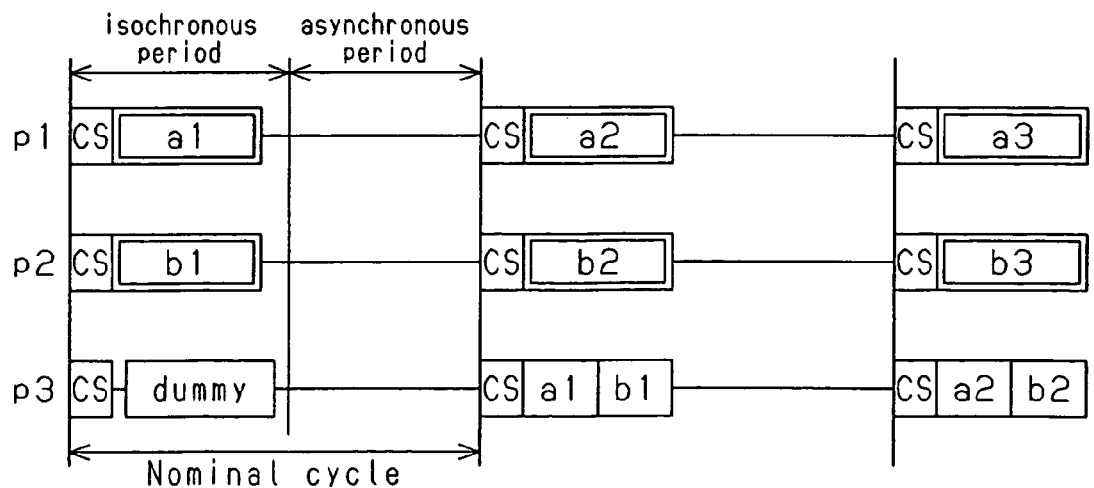
FIG. 14 is an explanatory diagram showing the operation of the transfer controller of FIG. 10.

FIG. 14 shows an example in which the packet data a1 and b1 stored in the buffer memory 18 is transferred in the next nominal cycle. More specifically, after the request signal and the grant signal are exchanged in response to the CS, the transfer controller 12 receives in parallel the different packet data a1 and b1 from the terminal devices 13a and 13b and stores the packet data a1 and b1 in the buffer memory 18. The transfer controller 12 does not transfer normal data from the port p3 to the host device 11 but transmits a dummy packet to ensure the occupancy right of the bus.

In the next nominal cycle, when provided with the CS, the transfer controller 12 receives in parallel the next packet data a2 and b2 from the terminal devices 13a and 13b and stores the packet data a2 and b2 in the buffer memory 18. In parallel with the data reception and the storage operation, the transfer controller 12 sequentially reads the packet data a1 and b1 stored in the buffer memory 18 during the previous cycle and transmits the packet data a1 and b1 from the port p3 to the host device 11. The above operation is repeated in each nominal cycle.

Due to such operation, parallel to the reception of packet data from the terminal devices 13a and 13b in each nominal cycle, normal data is not transferred but the transfer of packet data received in the previous cycle is enabled. This substantially widens the transfer band and easily ensures a sufficient asynchronous period as shown in FIG. 14.

Figure 15:
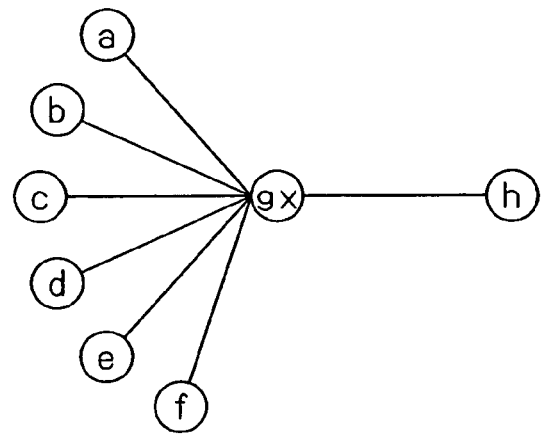
FIG. 15 is an explanatory diagram showing a topology including additional terminal devices.

FIG. 15 shows a topology in which the transfer controller 12 of the data transfer apparatus 200 having the topology of FIG. 8 is further connected to additional nodes (terminal devices). This topology includes a node gx corresponding to the transfer controller 12, five nodes a to f corresponding to terminal devices, and a node h corresponding to the host device 11. In this case, the transfer unit of node gx must include the same number of accumulators as the nodes, the number of which has been increased. The node gx receives packet data from the nodes a to f and transmits the packet data to the node h.

Figure 16:
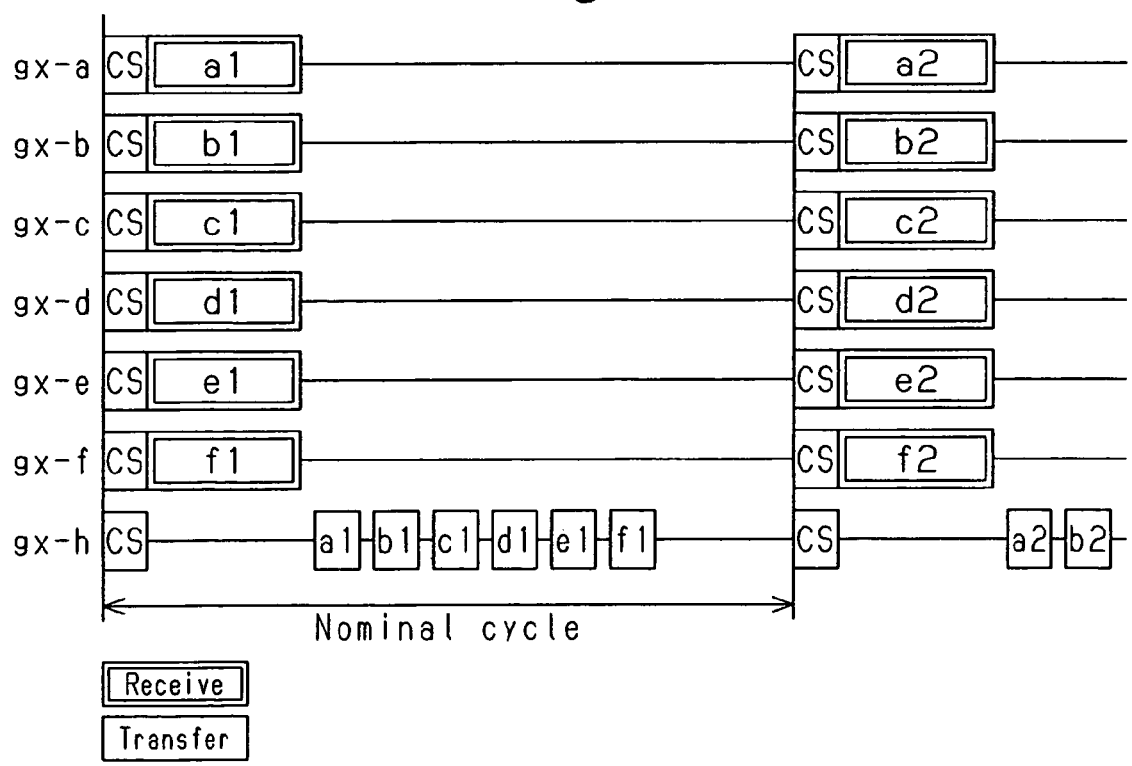
FIG. 16 is an explanatory diagram showing the operation of the transfer controller in the topology of FIG. 15.

FIG. 16 is an explanatory diagram showing the reception and transfer of data in the node gx. The transfer speed between the node gx and the node h is four times the transfer speed between the nodes a to f and the node gx. The node gx provides the other nodes with a CS when a nominal cycle is started, receives in parallel packet data a1 to f1 from the nodes a to f, and stores the received packet data a1 to f1 in the buffer memory 18. Then, node gx reads the packet data a1 to f1 from the buffer memory 18 and sequentially transfers the packet data a1 to f1 to the node h at the four times higher transfer speed. Such operation of the node gx substantially widens the transfer band.

Figure 17:
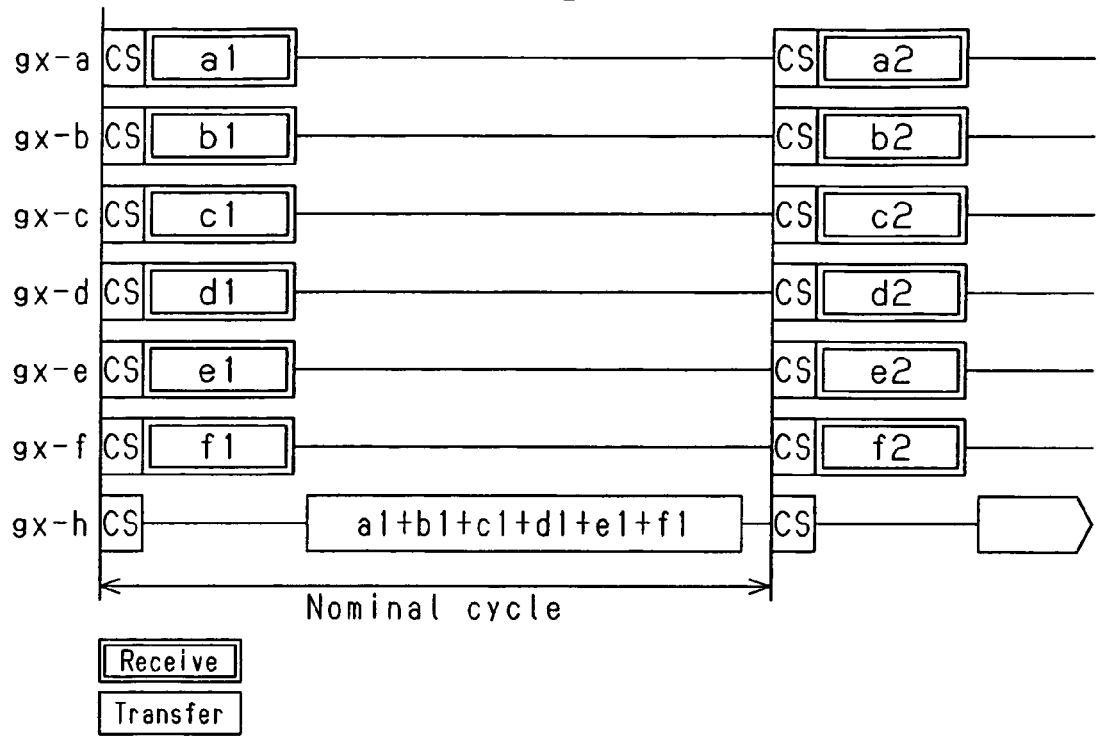
FIG. 17 is an explanatory diagram showing the operation of the transfer controller in the topology of FIG. 15.

FIG. 17 shows an example in which packet data stored in the buffer memory 18 is transferred in a state connected to a single packet. Such a data connection process is performed by the transceiver unit 16. In the example of FIG. 17, the transfer speed between the node gx and the node h is two times the transfer speed between the nodes a to f and the node gx. Further, the node h must divide the payload data of the transferred packet. The operation of the node gx, such as that shown in the example of FIG. 17, substantially widens the transfer band.

Figure 18:
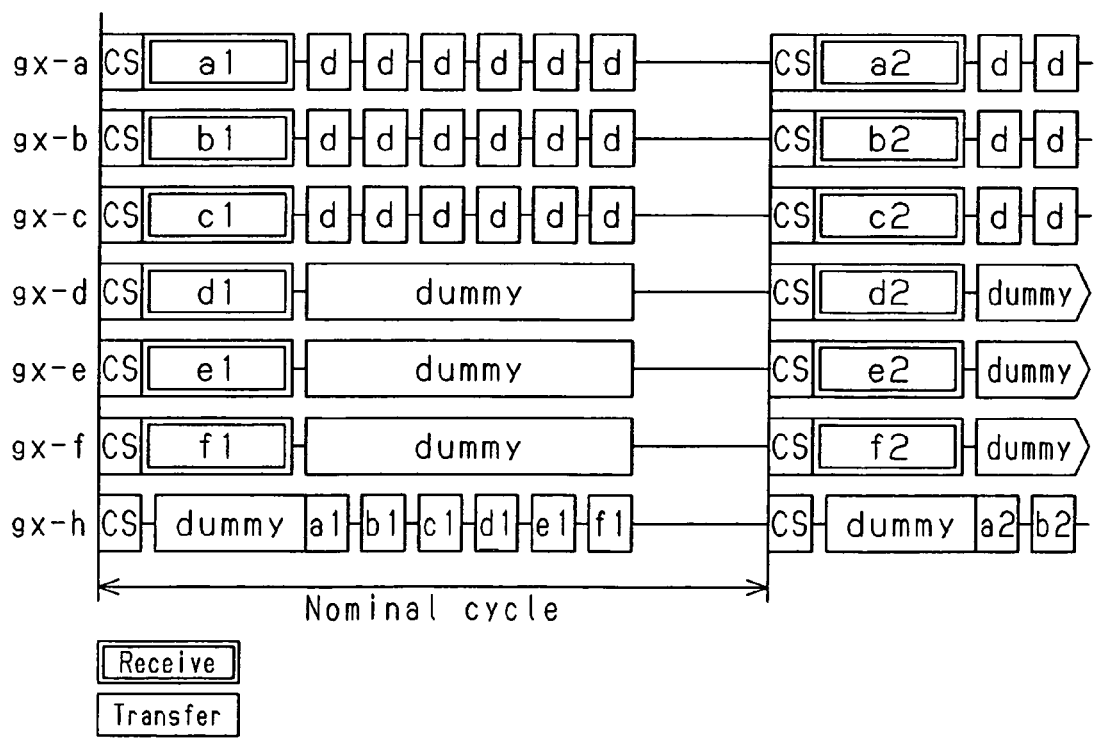
FIG. 18 is an explanatory diagram showing the operation of the transfer controller in the topology of FIG. 15.

FIG. 18 shows an example in which the transfer of a dummy packet is performed in addition to the transfer of data shown in FIG. 16. The node gx transfers a dummy packet to the node h when receiving the packet data a1 to f1 in parallel. Further, when transferring packet data a1 to f1 to the node h, the node gx transfers dummy packets to the nodes a to f. Such operation of the node gx ensures the bus occupancy right between the node gx and the node h and between the node gx and the nodes a to f. The dummy packets transferred from the node gx to the nodes a to f may be transferred at the same time as when the packet data a1 to f1 are transferred from the node gx to the node h or be transferred following the transfer of the packet data a1 to f1.

The data transfer apparatus 200 of the present embodiment has the advantages described below.

(1) During isochronous transfer, when transferring packet data from the terminal devices 13a and 13b (nodes a to f), which perform only packet data transmission, to the host device 11 (node h), the transfer controller 12 (node gx) located between the terminal devices 13a and 13b and the host device 11 functions like an independent topology. The transfer controller 12 provides in parallel the terminal devices 13a and 13b with a grant signal and receives in parallel different data from the terminal devices 13a and 13b. In this manner, by transferring in parallel packet data from the terminal devices 13a and 13b, the transfer band is widened.

(2) The transfer controller 12 includes the buffer memory 18, which functions as a storage means for temporarily storing different packet data synchronously received by the ports 14a and 14b in packet units. Accordingly, the received packet data is stored in the buffer memory 18 and then, upon completion of data reception, sequentially transferred to the host device 11.

(3) The transfer band is substantially widened by transferring the packet data stored in the buffer memory 18 in the next nominal cycle. This easily ensures a sufficient asynchronous period in each nominal cycle.

(4) When the transfer speed between the terminal devices 13a and 13b (nodes a to f) and the transfer controller 12 (node gx) is low and the transfer speed between the transfer controller 12 (node gx) and the host device 11 (node h) is high, packet data is transferred at a high speed from the transfer controller 12 to the host device 11 regardless of the transfer speed between the terminal devices 13a and 13b and the transfer controller 12. This widens the transfer band.

(5) By connecting the packet data that is transferred from the transfer controller 12 to the host device 11 to transfer the data as a single packet, the transfer band is widened.

(6) After receiving packet data from the terminal devices 13a and 13b (nodes a to f), the transfer controller 12 (node gx) transfers dummy packets to the terminal devices 13a and 13b (nodes a to f). This ensures the bus occupancy right between the terminal devices and the transfer controller.

It should be apparent to those skilled in the art that the present invention may be embodied in many other specific forms without departing from the spirit or scope of the invention. Particularly, it should be understood that the present invention may be embodied in the following forms.

The transfer controller 12 may transfer packet data between the terminal devices 13a and 13b via the host device 11 in accordance with a control signal provided from an external device.

During the data transfer shown in FIG. 14, the packet data a1 and b1 stored in the buffer memory 18 may be transferred in a state connected to a single packet.

The present examples and embodiments are to be considered as illustrative and not restrictive, and the invention is not to be limited to the details given herein, but may be modified within the scope and equivalence of the appended claims.

What is claimed is:

1. A method for transferring packet data from a plurality of terminal devices to a host device with serial buses, the method comprising:
   transferring a dummy packet from a transfer controller to the host device to ensure an occupancy right of a bus between the transfer controller and the host device when a plurality of packet data pieces are transferred in parallel from the terminal devices to the transfer controller including a temporary storage device;
   storing the plurality of packet data pieces in the temporary storage device; and
   transferring dummy packets from the transfer controller to all the terminal devices to ensure an occupancy right of buses between the transfer controller and the terminal devices when the plurality of packet data pieces stored in the temporary storage device are transferred to the host device.

2. The method according to claim 1, further comprising:
   connecting the plurality of packet data pieces stored in the temporary storage device to generate a single piece of packet data.

3. The method according to claim 1, wherein transferring the plurality of packet data pieces in parallel from the terminal devices and sequentially transferring the plurality of packet data pieces stored in the temporary storage device to the host device are performed during a single cycle.

4. The method according to claim 1, wherein the speed in which the plurality of packet data pieces are transferred to the host device is higher than the speed in which the plurality of packet data pieces are transferred in parallel from the terminal devices.

5. A method for performing isochronous transfer of packet data from a plurality of terminal devices to a host device with serial buses, the method comprising:
   transferring a dummy packet from a transfer controller to the host device during a first cycle to ensure an occupancy right of a bus between the transfer controller and the host device when a plurality of packet data pieces are transferred in parallel from the terminal devices to the transfer controller including a temporary storage device;
   storing the plurality of packet data pieces in the temporary storage device; and
   transferring dummy packets from the transfer controller to all the terminal devices during a second cycle to ensure an occupancy right of buses between the transfer controller and the terminal devices when a plurality of packet data pieces stored in the temporary storage device are transferred to the host device.

6. The method according to claim 5, wherein the first and second cycles each include an isochronous period, transferring the plurality of packet data pieces in parallel from the terminal devices and said sequentially transferring the plurality of packet data pieces stored in the temporary storage device to the host device are performed during the isochronous period.

7. The method according to claim 5, further comprising: connecting the plurality of packet data pieces stored in the temporary storage device to generate a single piece of packet data.

8. An apparatus for transferring a plurality of packet data pieces with serial buses, the apparatus comprising:
   a plurality of terminal devices that respectively generate the plurality of packet data pieces;
   a transfer controller coupled to the terminal devices and including a temporary storage device, in which the transfer controller receives the plurality of packet data pieces in parallel from the terminal devices and stores the received plurality of packet data pieces in the temporary storage device; and
   a host device coupled to the transfer controller, wherein the transfer controller sequentially transfers the plurality of packet data pieces stored in the temporary storage device to the host device,
   wherein the transfer controller transfers a dummy packet to the host device to ensure an occupancy right of a bus between the transfer controller and the host device when receiving the plurality of packet data pieces from the terminal devices, and wherein the transfer controller transfers dummy packets to all the plurality of terminal devices to ensure an occupancy right of the buses between the transfer controller and the terminal devices when transferring the plurality of packet data pieces stored in the temporary storage device to the host device.

9. The apparatus according to claim 8, wherein the transfer controller includes a transceiver unit, coupled to the temporary storage device, for controlling the transfer of the plurality of packet data pieces between the temporary storage device and the terminal devices and host device.

10. The apparatus according to claim 8, wherein the transfer controller receives the plurality of packet data pieces in parallel from the terminal devices during a first cycle, and sequentially transfers the plurality of packet data pieces stored in the temporary storage device to the host device during a second cycle.

11. The apparatus according to claim 10, wherein the first and second cycles each include an isochronous period, and the parallel transfer of the plurality of packet data pieces from the terminal devices and the transfer of the plurality of packet data pieces to the host device are performed during the isochronous period.

12. The apparatus according to claim 8, wherein the transfer controller connects the plurality of packet data pieces stored in the temporary storage device to generate a single piece of packet data.

13. The apparatus according to claim 8, wherein the speed in which the plurality of packet data pieces are transferred to the host device is higher than the speed in which the plurality of packet data pieces are transferred in parallel from the terminal devices.

14. An apparatus, coupled between a plurality of terminal devices and a host device with serial busses, for controlling transfer of a plurality of packet data pieces from the terminal devices to the host device, the apparatus comprising:
   a temporary storage device; and
   a transceiver unit, coupled to the temporary storage device, for receiving the plurality of packet data pieces in parallel from the terminal devices, storing the received plurality of packet data pieces in the temporary storage device, and sequentially transferring the plurality of packet data pieces stored in the temporary storage device to the host device,
   wherein the transceiver unit transfers a dummy packet to the host device to ensure an occupancy right of a bus between the transceiver unit and the host device when receiving the plurality of packet data pieces from the terminal devices, and wherein the transceiver unit transfers dummy packets to all the plurality of terminal devices to ensure an occupancy right of buses between the transceiver unit and the terminal devices when transferring the plurality of packet data pieces stored in the temporary storage device to the host device.

15. The apparatus according to claim 14, wherein the transceiver unit receives the plurality of packet data pieces in parallel from the terminal devices during a first cycle, and sequentially transfers the plurality of packet data pieces stored in the temporary storage device to the host device during a second cycle.

16. The apparatus according to claim 15, wherein the first and second cycles each include an isochronous period, the parallel transfer of the plurality of packet data pieces from the terminal devices and the transfer of the plurality of packet data pieces to the host device are performed during the isochronous period.

17. The apparatus according to claim 14, wherein the transceiver unit connects the plurality of packet data pieces stored in the temporary storage device to generate a single piece of packet data.

18. The apparatus according to claim 14, wherein the speed in which the plurality of packet data pieces are transferred to the host device is higher than the speed in which the plurality of packet data pieces are transferred in parallel from the terminal devices.

* * * * *

UNITED STATES PATENT AND TRADEMARK OFFICE
CERTIFICATE OF CORRECTION

| | | |
|---|---|---|
| PATENT NO. | : 8,427,955 B2 | Page 1 of 1 |
| APPLICATION NO. | : 11/036392 | |
| DATED | : April 23, 2013 | |
| INVENTOR(S) | : Ol | |

It is certified that error appears in the above-identified patent and that said Letters Patent is hereby corrected as shown below:

In the Claims

Column 8, Line 8, In Claim 5, delete "a" and insert -- the --, therefor.

Column 8, Line 43, In Claim 8, after "of" delete "the".

Signed and Sealed this
Twenty-fifth Day of March, 2014

Michelle K. Lee
*Deputy Director of the United States Patent and Trademark Office*